United States Patent [19]

Costello

[11] 4,398,662

[45] Aug. 16, 1983

[54] OIL TEMPERATURE REGULATOR

[75] Inventor: Norman F. Costello, Racine, Wis.

[73] Assignee: Modine Manufacturing Company, Racine, Wis.

[21] Appl. No.: 312,357

[22] Filed: Oct. 16, 1981

[51] Int. Cl.[3] ............................................. G05D 23/12
[52] U.S. Cl. .................................. 236/34.5; 236/93 A
[58] Field of Search ...................... 236/34, 34.5, 93 R, 236/93 A, 99 E; 165/40

[56] References Cited

U.S. PATENT DOCUMENTS

| | | | |
|---|---|---|---|
| 2,353,577 | 7/1944 | Magrum et al. | 236/34 |
| 2,359,448 | 10/1944 | Shaw | 236/34.5 X |
| 2,379,109 | 6/1945 | Shaw | 236/34.5 |
| 2,433,454 | 12/1947 | Hoffman | 236/34.5 X |
| 2,788,176 | 4/1957 | Andersen | 236/34.5 |
| 2,988,280 | 6/1961 | Kimm et al. | 236/34.5 |
| 3,506,192 | 4/1970 | Otto | 236/34.5 |
| 4,190,198 | 2/1980 | Casuga et al. | 236/34.5 |

Primary Examiner—William E. Tapolcai
Attorney, Agent, or Firm—Wood, Dalton, Phillips, Mason & Rowe

[57] ABSTRACT

An oil temperature regulator having a by-pass first passage means through the regulator for the oil, a heat exchange second passage means separate from the first, a cooler for transfer of heat between the cooler and the heat exchange second passage means, a first valve movable to open and close a first port between said oil entrance and heat exchange second passage, a second valve downstream from the first valve movable to open and close a second port between the by-pass and heat exchange passages for directing oil away from said by-pass passage through said heat exchange second passage at a selected temperature, a third valve downstream from the second valve movable to open and close a third port between the by-pass first passage means and the oil exit and temperature responsive means at the entrance operable by the entering oil at a first temperature to open the normally closed first valve at this temperature and temperature responsive means operable by the exiting oil at a second temperature higher than said first temperature to open the normally closed second valve and close the normally open third valve at this second temperature.

10 Claims, 6 Drawing Figures

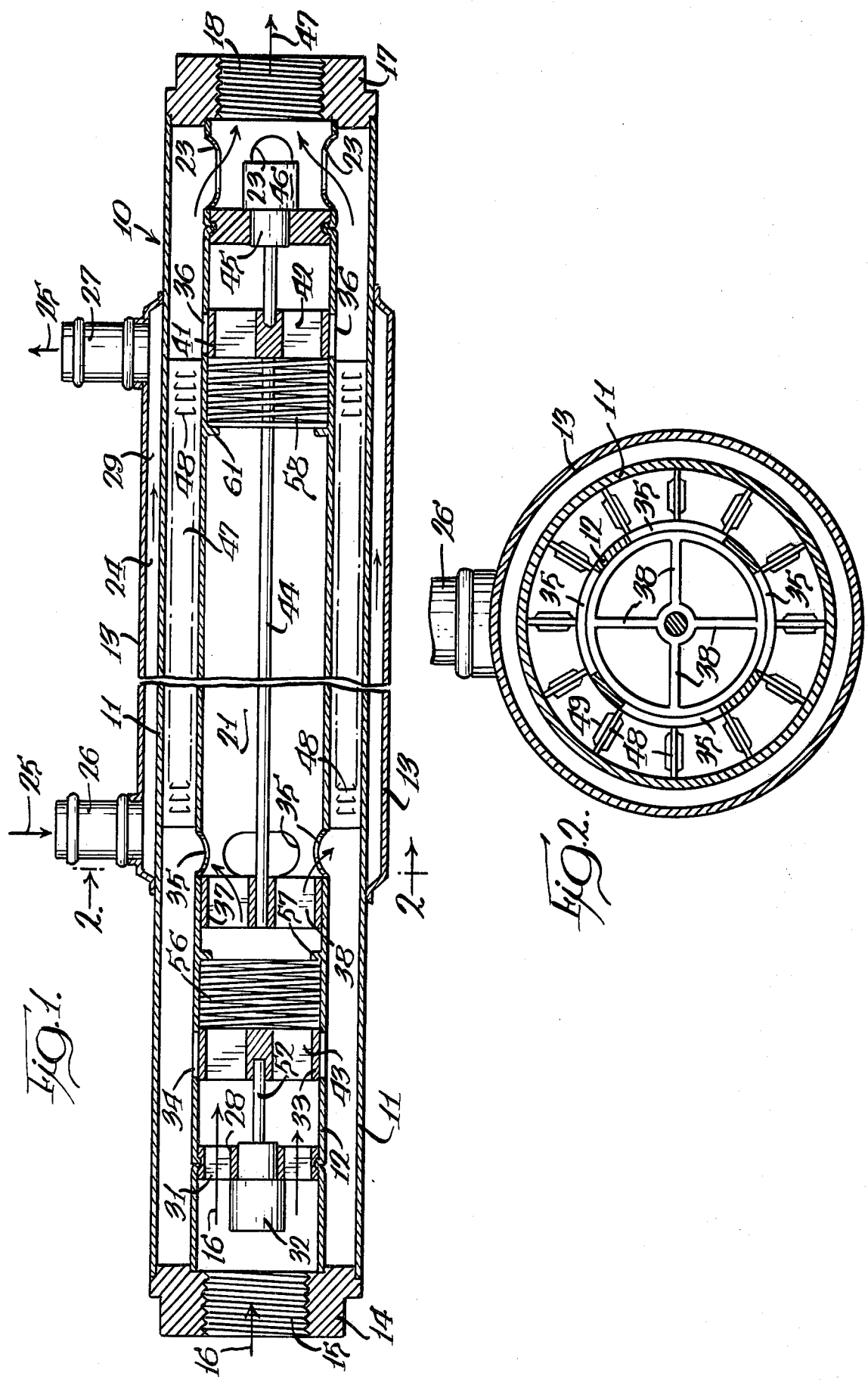

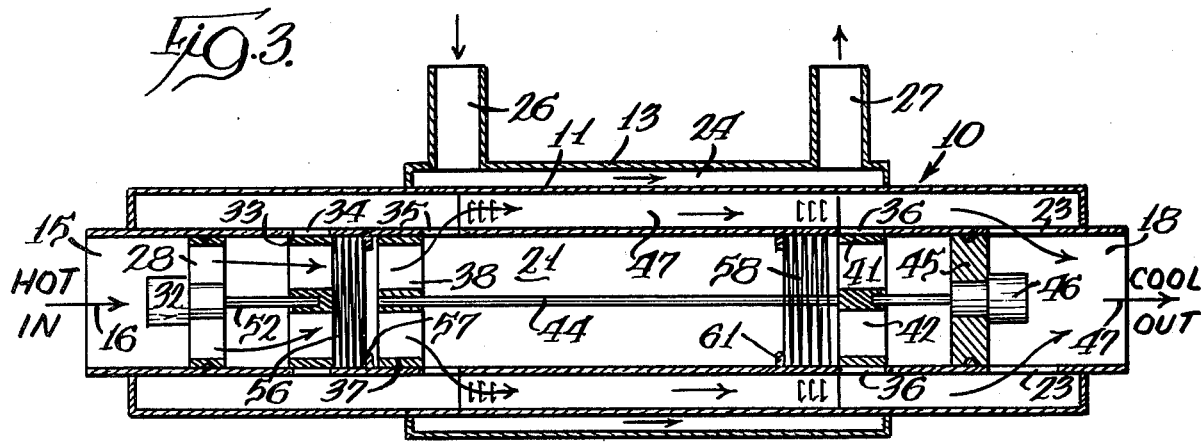
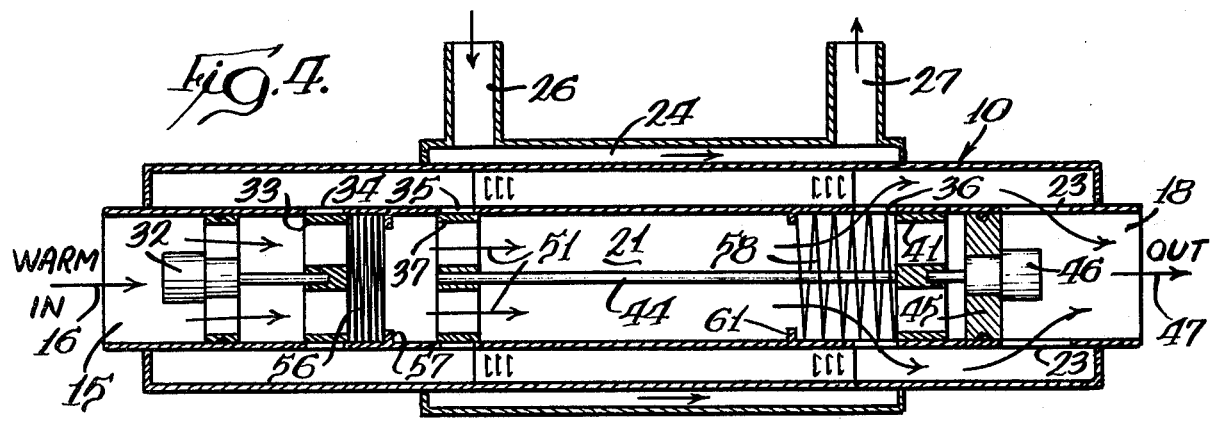
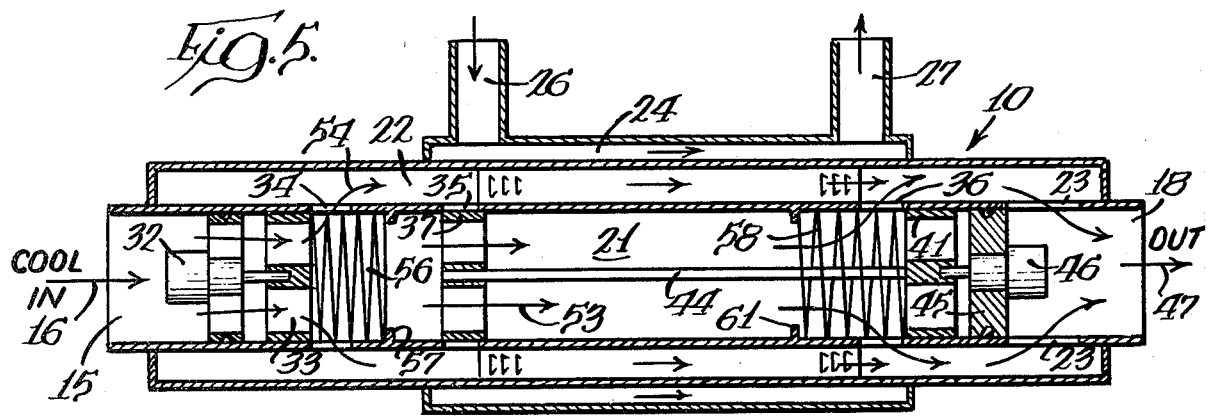

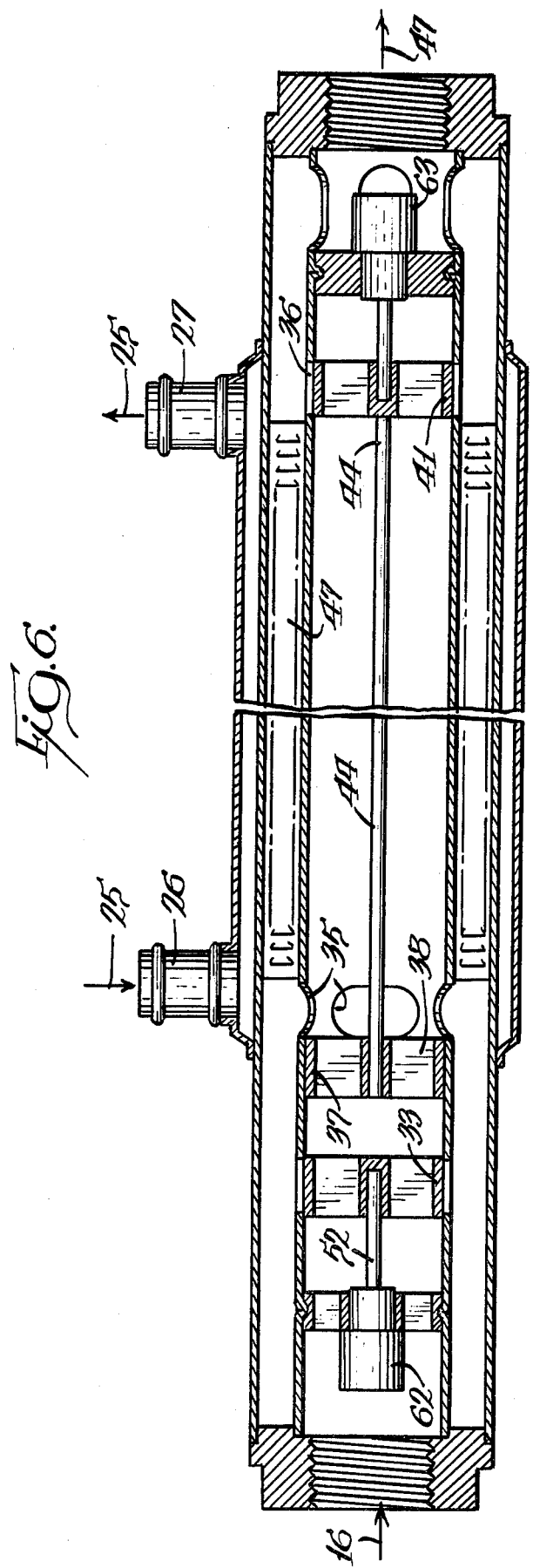

OIL TEMPERATURE REGULATOR

BACKGROUND OF THE INVENTION

Oil coolers for internal combustion engines and the like have long been used for cooling the oil for more efficient lubrication. Heretofore, such oil coolers have not attempted to control either the oil flow rate or the coolant flow rate in response to the oil temperature so as to achieve a more efficient temperature in the lubricating oil. In the present invention, the oil is either cooled when it is too hot or warmed when it is too cold or neither cooled nor warmed when neither is required and the operation of the oil temperature regulator is controlled only by the temperature of the oil itself.

This means that if the entering oil flowing through the regulator is too cold for most efficient operation of the engine, it is not cooled but is allowed to receive heat in its passage through the engine. If, on the other hand, the oil is too hot, it is directed through a cooling portion of the regulator where the excess heat is removed. Where the oil is at the proper temperature, it is passed through the regulator in parallel large passages so as to reduce the pressure drop of the oil flowing through the regulator.

BRIEF DESCRIPTION OF THE DRAWINGS

FIG. 1 is a longitudinal axial sectional view through an oil temperature regulator embodying the invention;

FIG. 2 is a transverse sectional view taken along line 2—2 of FIG. 1;

FIG. 3 is a semi-schematic sectional view similar to FIG. 1 and showing the operating parts on one position where hot oil is cooled;

FIG. 4 is a view similar to FIG. 3 but shows the operating parts in a second position directing oil in a by-pass position away from the cooling passage; and FIG. 5 is a view similar to FIGS. 3 and 4 and illustrates the parts in a third position to direct the oil through all flow passages with minimum pressure drop; and FIG. 6 is a view similar to FIG. 1 but illustrating a second embodiment of the invention.

DESCRIPTION OF THE PREFERRED EMBODIMENT

In the embodiment illustrated in the drawings, the temperature regulator 10 comprises an elongated body comprising concentric spaced tubes 11, 12 and 13. The regulator is provided with fitting 14 having an axial entrance opening 15 for the flowing oil 16 and a second similar fitting 17 on the opposite end of the regulator 10 having a similar exit opening 18 for the flowing oil 16.

The innermost tube 12 defines on its interior a by-pass first passage means 21 communicating at each end with the entrance 15 and exit openings.

The spacing between the tubes 11 and 12 defines a heat exchange second passage means 22 that extends substantially the entire length of the regulator 10 and that is provided adjacent the exit 18 with circumferentially spaced permanently open ports 23.

The outer tube 13 is spaced from the next outer tube 11 to provide a cooler in the form of a liquid coolant jacket having a chamber 24 for flow of liquid coolant 25 therethrough by way of an entrance fitting 26 and an exit fitting 27. The tubes 11, 12 and 13 are all coaxial and the coolant chamber 24 is also coaxial with these tubes.

Mounted on a first partition 28 that is permeable to liquid flow therethrough between radial spokes 31 is a first temperature responsive device 32 adapted to be contacted by the flowing oil 16 to move a first valve 33 between the open position of FIG. 5 and the closed position of FIGS. 1, 3 and 4. This first valve thereby opens and closes a first port 34 between the oil entrance 15 and the heat exchange second passage 22.

Downstream of the first port 34 is located a second port 35 between the by-pass first 21 and heat exchange second 22 passages.

Downstream from the second port 35 is a third port 36 that also communicates between the by-pass passage 21 and the heat exchange passage 22.

Thus, all ports 34, 35 and 36 communicate between the by-pass and heat exchange passages 21 and 22. In the illustrated embodiment, all of these ports are in the form of circumferentially spaced openings as illustrated by the ports 35 in the sectional view of FIG. 2. Also in the illustrated embodiment, the ports 34 are adjacent to the entrance 15, the ports 35 are a short distance downstream therefrom and the ports 36 are adjacent to the exit 18 and the permanently open exit ports 23.

Ports 35 are open and closed by a slidable second valve 37 provided with spokes 38 through which the oil 16 can flow relatively unimpeded.

The third ports 36 are open and closed by a third valve 41 also provided with spokes 42 similar to the spokes 38 on the second valve 37 and the spokes 43 on the first valve 33. Each of these valves 33, 37 and 41 are in the form of short cylinders that are slidably mounted on the interior surface of the central tube 12 that defines the by-pass first passage 21.

The second valve 37 which is adjacent to the first valve 33 and the third valve 41 which is nearer the exit 18 are mounted for conjoint movement on an elongated rod 44 that is coaxial with the tubes 11, 12 and 13.

The second valve 37 is mounted on the upstream end of this rod 44 while the third valve 41 is mounted adjacent to the other end of this rod. This other or downstream end of the rod extends through a solid cross partition 45 in the by-pass tube 12 which also carries a second temperature responsive device 46 which is adjacent to the exit 18.

Thus, with this arrangement, the first or entrance temperature responsive device 32 is subjected to the temperature of the entering oil 16 while the second temperature responsive device 46 is subjected on the exiting oil 47.

The two devices 32 and 46 operate at different temperatures. Thus, the entrance temperature responsive device 32 operates at one temperature to open the normally closed ports 34 while device 46 operates at a second and higher temperature to close the normally open ports 35 and open the normally closed ports 36 in the illustrated embodiment because of the mounting of the valves 37 and 41 on the same rod 44 which is moved by the single temperature responsive device 46. These openings and closings are simultaneous.

In a typical embodiment for cooling the oil of an internal combustion engine, the first or entrance temperature responsive device operates at about 180° F. while the second or exit temperature responsive device 46 operates at the higher temperature of about 250° F.

In order to aid in heat transfer, the heat exchange second passage 22 is provided with radiating louvered fins 48 having spaced louvers illustrated at 49 therein. These fins may take any form desired and a typical embodiment is illustrated in end elevational view in FIG. 2. The operation of the oil temperature controlled oil temperature regulator of this invention is as follows. Hot oil 16 at an elevated temperature that is above the set points of both temperature responsive devices 32 and 46 causes valves 33, 37 and 41 to be in their extended positions so that ports 34 and 36 are closed and ports 35 are open. This causes the incoming oil 16 to flow through the cooling second passage 22 from the by-pass inner passage 21 and out the exit 18 by way of the exit ports 23. During this passage, the oil is cooled by heat exchange with liquid coolant 25 in the chamber 24. These conditions are illustrated in FIGS. 1 and 3.

If the incoming oil 16 is at a temperature between the set points of the thermally responsive devices 32 and 46 (such as between 180° and 250° F.), then the conditions of FIG. 4 apply. The incoming oil 16 being above the set point of the entrance temperature responsive device 32 causes the valve 33 to be moved to the closed position. If the temperature of the oil is beneath the set point of the temperature responsive device 46, the rod 44 is retracted to close the ports 35 and open the ports 36. In this position, the oil 51 by-passes the heat exchange second passage 22 and flows entirely through the inner by-pass passage 21.

If the incoming oil temperature is below the set points of both temperature responsive devices 32 and 46, then the conditions of FIG. 5 prevail with both valve 33 on its rod 52 retracted and valves 37 and 41 on their common rod 44 retracted with the result that ports 34 and 36 are open and port 35 is closed. Then the flow of oil is divided between a portion 53 flowing through the by-pass first passage 21 and a portion 54 flowing through the heat exchange second passage 22. This not only reduces the pressure drop of the oil flow through the temperature regulator; this flow of the portion 54 through the heat exchange passage 22 also permits this oil portion to give up heat to the coolant if it is hotter than the coolant and to receive heat from the coolant if it is cooler than the coolant.

As can be seen from the above description, the device of this invention regulates the temperature of the oil by heating the oil it if is too cold and cooling the oil if it is too hot with the functioning of the device being entirely automatic and controlled fully by the temperature of the oil itself.

In the embodiment of FIGS. 1-5, the first or inlet valve 33 is urged toward retracted position, or to the left, by a helical return spring 56 bearing between an inwardly directed annular flange 57 and the side of valve 31 opposite to the first temperature responsive device 32. The third or outlet valve 41 is urged toward retracted position by a similar return spring 58 extending between and bearing against a similar flange 61 and the third valve 41. The simultaneous retracted position of both valves are illustrated in FIG. 5.

FIG. 6 illustrates an embodiment where return springs are not necessary as the temperature responsive devices 62 and 63 themselves are retractive under the above discussed temperature changes.

I claim:

1. An oil temperature regulator, comprising:
means providing an oil entrance to said regulator;
means providing an oil exit from said regulator;
by-pass first passage means through said regulator for said oil;
heat exchange second passage means separate from said first passage means;
a cooler in heat exchange relationship with said heat exchange second passage means for transfer of heat therebetween;
a first valve movable to open and close a first port between said oil entrance and said heat exchange second passage;
a second valve downstream from said first valve movable to open and close a second port between said by-pass first and heat exchange second passage means;
a third valve downstream from said second valve movable to open and close a third port between said by-pass first passage means and said oil exit;
first temperature responsive means at said entrance operable by said entering oil at a first temperature to open said normally closed first valve at said first temperature; and
second temperature responsive means operable by said exiting oil at a second temperature higher than said first temperature to open said normally closed second valve and close said normally open third valve at said second temperature.

2. The regulator of claim 1 wherein said cooler comprises a liquid coolant jacket.

3. The regulator of claim 1 wherein said third valve is adjacent to said exit means.

4. The regulator of claim 1 wherein there are provided means connecting said second and third valves for conjoint movement.

5. The regulator of claim 2 wherein said first and second passage means and liquid coolant jacket comprise substantially concentric tubes that are substantially coaxial with said oil entrance and oil exit.

6. The regulator of claim 1 wherein said temperature responsive means at said exit simultaneously moves both said second and third valves with the second valve being closed when the third valve is open and the second valve being open when the third valve is closed, said second and third valves being mounted for simultaneous movement on a rod that is substantially coaxial with said by-pass first passage means.

7. The regulator of claim 1 wherein said first, second and third valves each comprise a slidable valve member within a tube comprising said entrance, by-pass first passage means and exit.

8. The regulator of claim 1 wherein said regulator comprises concentric tubes spaced apart to provide said second passage means and liquid coolant jacket, one of said tubes being an innermost tube comprising said by-pass passage.

9. The regulator of claim 1 wherein said first, second and third valves each comprise a slidable valve member within a tube comprising said entrance, by-pass first passage means and exit, and said regulator comprises concentric tubes spaced apart to provide said second passage means and liquid coolant jacket, one of said tubes being an innermost tube comprising said by-pass passage.

10. An oil temperature regulator comprising:
an oil entrance means to an oil exit means from said regulator for oil flow through the regulator;
a cooling section;
a by-pass section separate from said cooling section, said sections being between said entrance and exit;
a first temperature responsive device adjacent to said entrance and subjected to said oil and operable at a first temperature;

a second temperature responsive device adjacent to said exit subjected to said oil and operable at a second temperature that is higher than said first temperature; and valve means operated by said temperature responsive devices including
  (a) means for directing said oil flow into said cooling section when said oil flow is at a temperature above both said first and second temperatures of both said temperature responsive devices,
  (b) means for directing said oil flow through said by-pass section and away from said cooling section when said oil temperature is between said first and second temperatures of said temperature responsive devices and
  (c) means for directing said oil flow through both said sections when said oil temperature is below said first and second temperatures of both said temperature responsive devices.

* * * * *